United States Patent
Wong et al.

(10) Patent No.: US 6,775,164 B2
(45) Date of Patent: Aug. 10, 2004

(54) THREE-TERMINAL, LOW VOLTAGE PULSE WIDTH MODULATION CONTROLLER IC

(75) Inventors: Chuck Wong, Union City, CA (US); Paul W. Latham, II, Lee, NH (US); Shawn Laliberte, Newton, NH (US)

(73) Assignee: Tyco Electronics Corporation, Middletown, PA (US)

( * ) Notice: Subject to any disclaimer, the term of this patent is extended or adjusted under 35 U.S.C. 154(b) by 25 days.

(21) Appl. No.: 10/099,661

(22) Filed: Mar. 14, 2002

(65) Prior Publication Data

US 2003/0174528 A1 Sep. 18, 2003

(51) Int. Cl.⁷ ................................................ H02M 1/00
(52) U.S. Cl. ............................ 363/147; 363/41; 363/49
(58) Field of Search ............................... 363/21.01, 40, 363/41, 49, 95, 97, 131, 147

(56) References Cited

U.S. PATENT DOCUMENTS

| | | | |
|---|---|---|---|
| 3,818,311 A | 6/1974 | Mattson et al. ............... 321/43 |
| 3,873,846 A | 3/1975 | Morio et al. ................... 307/23 |
| 4,253,136 A | 2/1981 | Nanko .......................... 363/21 |
| 4,339,697 A | 7/1982 | Franz .......................... 318/341 |
| 4,638,417 A | 1/1987 | Martin, Jr. et al. ............ 363/41 |
| 4,746,899 A | 5/1988 | Swanson et al. ............. 340/347 |
| 5,006,973 A | * | 4/1991 | Turner .......................... 363/34 |

(List continued on next page.)

FOREIGN PATENT DOCUMENTS

| | | | | |
|---|---|---|---|---|
| DE | 3539558 A1 | 5/1987 | ............ H02M/1/00 |
| DE | 4007213 A1 | 9/1990 | |
| EP | 0665630 A2 | 8/1995 | .......... H02M/3/156 |
| EP | 0 744 818 A1 | 11/1996 | |
| EP | 0 657 987 B1 | 3/1998 | |
| GB | 2 230 114 A | 10/1990 | |
| GB | 2 081 989 A | 2/1992 | |
| GB | 2 262 822 A | 6/1993 | |
| JP | 6-205582 | 7/1994 | |
| JP | 6-327248 | 11/1994 | |
| JP | 7-213056 | 8/1995 | |
| JP | 11-27941 | 1/1999 | |
| JP | 11-69801 | 3/1999 | |
| WO | WO 97/44900 | 11/1997 | .......... H03K/17/10 |
| WO | WO 00/36739 | 6/2000 | .......... H02M/3/335 |
| WO | WO 02/09263 | 1/2002 | .......... H02M/3/157 |

OTHER PUBLICATIONS

U.S. application No. 09/608,459 (Wong), filed Jun. 29, 2000.

Albert O'Grady, "Harness the Power of Σ–Δ and Switched Capacitor Technologies in Signal Processing Components", Sensors, Nov. 1998 (URL: http://www.sensorsmag.com/articles/1198/main.shtml, down loaded Feb. 14, 2002).

Patent Abstracts of Japan, vol. 016, No. 048 (E–1163), Feb. 6, 1992 & JP 03 251080 A (Ricoh Co. Ltd.), Nov. 8, 1991.

International Search Report mailed Sep. 12, 2001 for International Application No. PCT/US 01/04855 which is a counterpart for U.S. application No. 09/608,459, filed Jun. 29, 2000, showing the relevance of the cited art.

(List continued on next page.)

Primary Examiner—Adolf Berhane

(57) ABSTRACT

A three-terminal low-voltage PWM controller chip includes a first terminal for receiving operating bias current supply and a feedback control signal related to an output parameter of an electrical circuit to be controlled; a second terminal connected to an output switch providing digital width-modulated control pulses to control duty cycle of the electrical circuit; a third terminal ground connection; a clocked pulse width modulation circuit responsive to current flow between the second terminal and the third terminal and the feedback control value for controlling the digital output switch; and, feedback signal separation circuitry for separating the feedback control signal from the operating bias current supply. A start-up circuit is also provided.

10 Claims, 3 Drawing Sheets

U.S. PATENT DOCUMENTS

| | | | |
|---|---|---|---|
| 5,148,170 A | | 9/1992 | Leopold et al. ............. 341/157 |
| 5,289,101 A | | 2/1994 | Furuta et al. ................. 320/21 |
| 5,313,381 A | | 5/1994 | Balakrishnan .............. 363/147 |
| 5,414,611 A | * | 5/1995 | Muto et al. .............. 363/21.15 |
| 5,436,820 A | | 7/1995 | Furmanczyk ................. 363/49 |
| 5,477,175 A | | 12/1995 | Tisinger et al. ............. 327/143 |
| 5,488,551 A | | 1/1996 | Malik .......................... 363/20 |
| 5,602,724 A | | 2/1997 | Balakrishnan ............... 363/21 |
| 5,661,642 A | | 8/1997 | Shimashita .................. 363/21 |
| 5,684,679 A | | 11/1997 | Hong .......................... 363/21 |
| 5,731,728 A | | 3/1998 | Greiss ........................ 327/299 |
| 5,739,658 A | * | 4/1998 | Thompson .................. 318/599 |
| 5,757,627 A | | 5/1998 | Faulk .......................... 363/21 |
| 5,812,383 A | | 9/1998 | Majid et al. ................... 363/21 |
| 5,815,380 A | | 9/1998 | Cuk et al. ..................... 363/16 |
| 5,880,942 A | | 3/1999 | Leu .............................. 363/49 |
| 6,049,471 A | | 4/2000 | Korcharz et al. ............. 363/20 |
| 6,075,353 A | * | 6/2000 | Johnson et al. ............. 323/285 |
| 6,107,851 A | | 8/2000 | Balakirshnan et al. ...... 327/172 |
| 6,169,506 B1 | | 1/2001 | Oprescu et al. ............. 341/143 |
| 6,208,279 B1 | | 3/2001 | Oprescu ..................... 341/143 |
| 6,229,366 B1 | | 5/2001 | Balakirshnan et al. ...... 327/172 |

OTHER PUBLICATIONS

Bruckner et al., "Optimizing Converter Design and Performance Utilizing Micro Controll System Feedback and Control", *Proc. Of Powercon 8,* Dallas, Texas, Apr. 27–30, 1981, E2, pp. 1–10.

Lin et al., "Reduction of Power Supply EMI Emission by Switching Frequency Modulation", *IEEE Trans. On Power Electronics,* vol. 9, No. 1, Jan. 1994, pp. 132–137.

Unitrode High Speed PWM Controller data sheet, Sep. 1995, pp. 1–8.

Brooks R. Leman, "Three–Terminal Power IC Cuts Off–line Flyback Switcher Size and Cost", Power Conversion and Intelligent Motion, Intertec Communications, Aug. 1995, pp. 15–28.

Nils Backman and Tadeus Wolpert, "Simplified Single Stage PFC Including Peak Current Mode Control In a Flyback Converter", Intelec 2000; $22^{nd}$ International Telecommunications Energy Conference, Sep. 10, 2000, pp. 317–234.

Lee Shaeffer, "Use FETs to Switch High Currents: New Types of MOSFETs and JFETs Can Handle Current Levels of Several Amps and Have Almost Negligible Drive–Current Requirements", Electronic Design, Penton Publishing, vol. 24, No. 9, Apr. 26, 1976, pp. 66–72.

Patent Abstracts of Japan, vol. 013, No. 421 (E–822), Sep. 19, 1989 & Japanese Publication No. JP 01 157270 (Toshiba Corp.), Jun. 20, 1989 (abstract only).

Patent Abstracts of Japan, vol. 016, No. 279 (E–1220), Jun. 22, 1992 & Japanese Publication No. JP 04 067768A (Nakajima Audio Kenkyusho), Mar. 3, 1992 (abstract only).

S. Huth, "The Influence of Optimal Programmed Pulse Width Modulation on the Static and Dynamic Output Behaviour of a Digital Controlled DC/DC–Converter", EPE '95, Sep. 19, 1995, pp. 1.758–1.763.

* cited by examiner

THREE-TERMINAL, LOW VOLTAGE PULSE WIDTH MODULATION CONTROLLER IC

CROSS-REFERENCE TO RELATED APPLICATIONS

The present application is related to commonly assigned, copending U.S. patent application Ser. No. 10/099,703, filed on the same date as this application and entitled: "CMOS Digital Pulse Width Modulation Controller" the disclosure thereof being incorporated herein by reference.

BACKGROUND OF THE INVENTION

1. Field of the Invention

The present invention relates to pulse width modulation (PWM) controllers. More particularly, the present invention relates to a three-terminal, low-voltage, pulse width modulation (PWM) controller integrated circuit (IC) for providing source control of a switching element within an electrical circuit such as an off-line switching power supply, DC-to-DC boost converter, or motor controller.

2. Introduction to the Invention

It is very desirable to minimize the cost, size and power dissipation of a low-cost off-line switching power supply for low power applications, such as recharging cells and batteries used in portable consumer appliances, such as entertainment units, personal digital assistants, and cell phones, for example. One method to achieve these desirable goals is to use one or several integrated circuits in standard packages, whether dual-in-line (DIP) or three-pin to realize a pulse width modulation (PWM) controller to control power supply switched duty cycle.

PWM controllers are typically designed to regulate the output voltage of a switching power supply. A PWM switched power supply requires a variable pulse width that is controlled by an error signal derived by comparing actual output voltage to a precise reference voltage. The pulse width of the switching interval must also be constrained to be within a minimum and maximum duration. These constraints are imposed for correct PWM power supply or motor driver operation.

One example of a conventional three-pin PWM controller integrated circuit (IC) is found in U.S. Pat. No. 5,313,381. While this prior approach appears to have been satisfactory in its time, it has several drawbacks. First, it employs both bipolar and MOS technologies, and therefore has added fabrication process complexities. Second, it includes an on-board high voltage power switching field effect transistor (FET). The high voltage switching FET takes up approximately half of the chip area, and the area remaining for other circuits becomes limited. Because the high voltage switching FET is on-chip, special steps must be followed in chip design and fabrication to accommodate the high voltage swings present at the chip during switching circuit operation. Also, the high voltage switching FET requires a relatively large IC package capable to meet the creepage requirements as well as conducting heat to an external heat sink, such as a TO-220 three-terminal package having a heat sink tab, and has a thermal dissipation limit which ultimately restricts the practical amount of power that can be switched in a switching power supply using this prior approach irrespective of external heat dissipation arrangements. Furthermore, since no voltage is available at the secondary side of a switching power supply at start up, a special low voltage tap within the high voltage FET structure must be provided and used in this prior approach in order to obtain primary side start-up voltage.

Thus, a hitherto unsolved need has remained for a low cost, low voltage PWM controller IC which may be packaged in a variety of available, low cost IC packages depending on application in a manner overcoming limitations and drawbacks of the prior art approaches.

BRIEF SUMMARY OF THE INVENTION

A general object of the present invention is to provide a three-terminal low-cost, low-voltage PWM controller IC architecture overcoming limitations and drawbacks of the prior art.

Another object of the present invention is to provide a low-voltage PWM controller IC for providing source control of an external current-regulating circuit element, such as a high-voltage switching transistor.

Another object of the present invention is to provide a low-voltage PWM controller IC which does not require high voltage insulation and conduction of excessive heat to the external ambient and which may therefore be packaged in a variety of low cost plastic packages, including three-terminal packages.

Another object of the present invention is to provide switching power supply primary side topologies effectively configured to use the low-voltage PWM controller IC of the present invention.

Another object of the present invention is to provide an on-chip start-up circuit for providing initial start-up power to start the PWM controller of the present invention, without requiring an additional high voltage device.

A further object of the present invention is to provide a PWM controller which may be implemented as an integrated circuit employing a low voltage IC fabrication process.

One other object of the present invention is to provide a three-terminal lowv-oltage PWM controller IC which responds to a plurality of error parameters in developing width modulation control pulses, such as output voltage feedback as well as internal switching current flow controlling the external electrical circuit.

In accordance with principles of the present invention, a three-terminal low-voltage pulse width modulation (PWM) controller is embodied in a unitary integrated circuit (IC). The circuit includes a first terminal providing an input node for receiving operating bias current supply and a feedback control signal related to an output parameter of an electrical circuit controlled by the digital PWM controller; a second terminal providing an output node connected to a digital output switch providing digital width-modulated control pulses at a control pulse rate to control duty cycle of the electrical circuit, the digital width-modulated control pulses being width-modulated in relation to the feedback control value; a third terminal providing a ground connection; clocked pulse width modulation circuitry responsive to current flow between the second terminal and the third terminal and the feedback control value for controlling the digital output switch at the control pulse rate; and, feedback signal separation circuitry for separating the feedback control signal from the operating bias current supply, most preferably a current sensing resistor in series with the digital output switch and the ground terminal for sensing current flow between the second terminal and the third terminal as a voltage.

As one aspect of the present invention, the low-voltage PWM controller IC includes a start-up circuit for initially connecting the second terminal to the first terminal to permit voltage initially present at the second terminal to charge an external storage capacitor connected to the first terminal, until the operating bias current supply is present at the first terminal. The start-up circuit most preferably includes a first transistor and a diode in a conduction path from the second terminal to the first terminal, a second transistor for controlling a gate electrode of the first transistor, the second transistor being controlled by a logic circuit responsive to presence of the operating bias current supply at the first terminal. The logic circuit most preferably includes a high voltage comparator for comparing voltage level at the first terminal with a reference high voltage level, and a latch reset by the high voltage comparator, the latch directly controlling a gate electrode of the second transistor. The logic circuit may also include a low voltage comparator for comparing voltage level at the first terminal with a reference low voltage level, so that if a low voltage condition is sensed to be present at the first terminal, the latch will become set by the low voltage comparator in order to turn on the first transistor and reestablish a conduction path from the second terminal to the first terminal.

As another aspect of the present invention, the three-terminal low-voltage PWM controller is encapsulated in a three lead TO-92 miniature plastic package for through-hole installation into a circuit board of the electrical circuit, a first lead corresponding to the first terminal, a second lead corresponding to the second terminal, and a third lead corresponding to the third terminal.

As one more aspect of the present invention, the electrical circuit is a switching power supply having a switching N-channel FET configured in a common-gate mode. In this arrangement, the second terminal connects directly to a source electrode of the switching FET.

In one more aspect of the present invention, the electrical circuit is a DC-to-DC switching boost converter and the second terminal is connected to shunt an energy-storing inductor to ground.

These and other objects, advantages, aspects and features of the present invention will be more fully understood and appreciated upon consideration of the detailed description of preferred embodiments presented in conjunction with the following drawings.

DETAILED DESCRIPTION OF THE INVENTION

Figure 1:
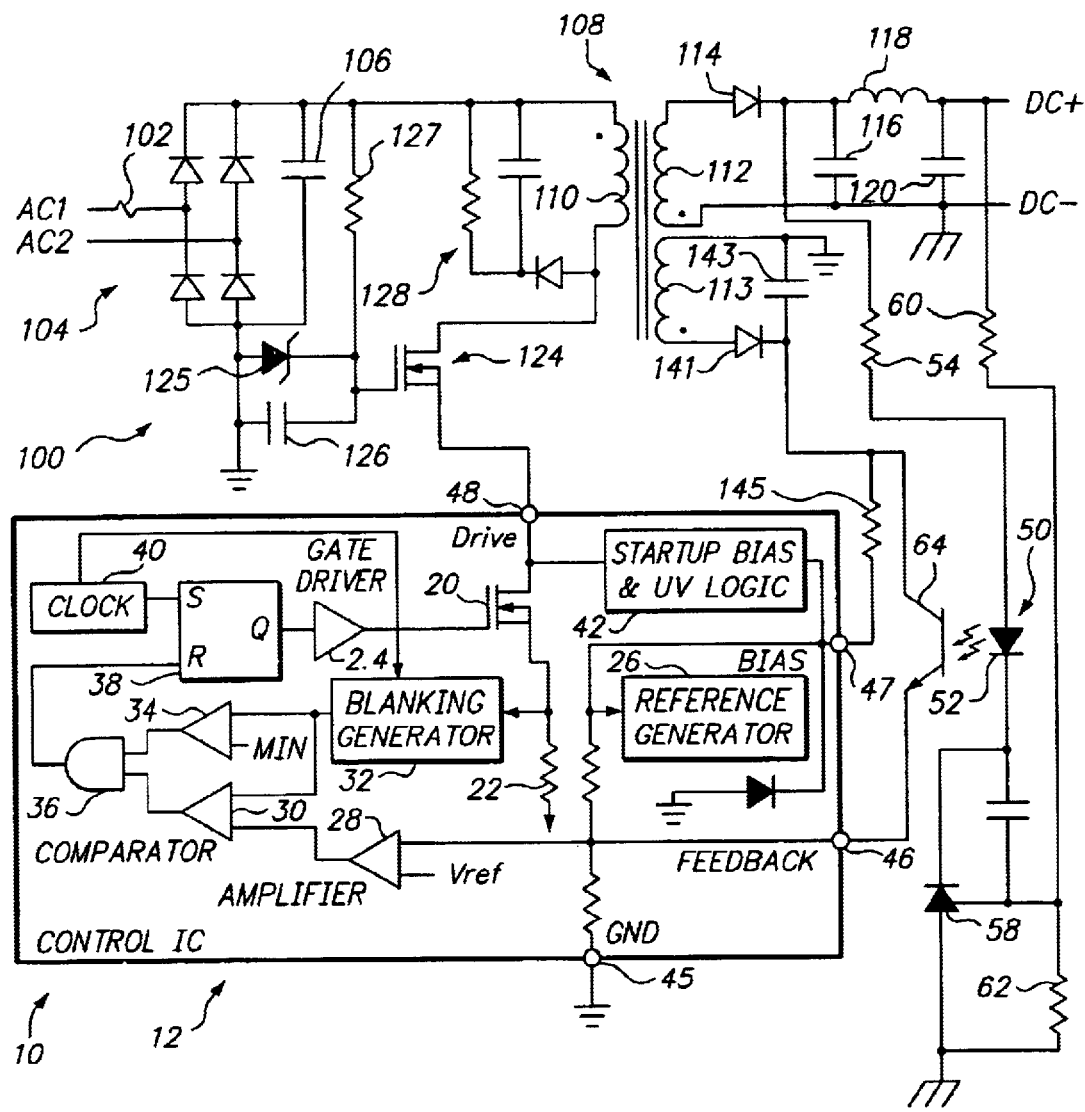
FIG. 1 is a logic block and schematic circuit diagram of an off-line switching power supply having a low-voltage, four-terminal PWM controller IC in accordance with principles of the present invention.

FIG. 1 diagrams an off-line switching power supply, and a low voltage PWM controller IC 10 providing source-mode PWM control at the primary side of the power supply, based upon feedback received from the secondary side and source current passing through a primary side external high voltage switching field effect transistor (FET), for example.

Figure 2:
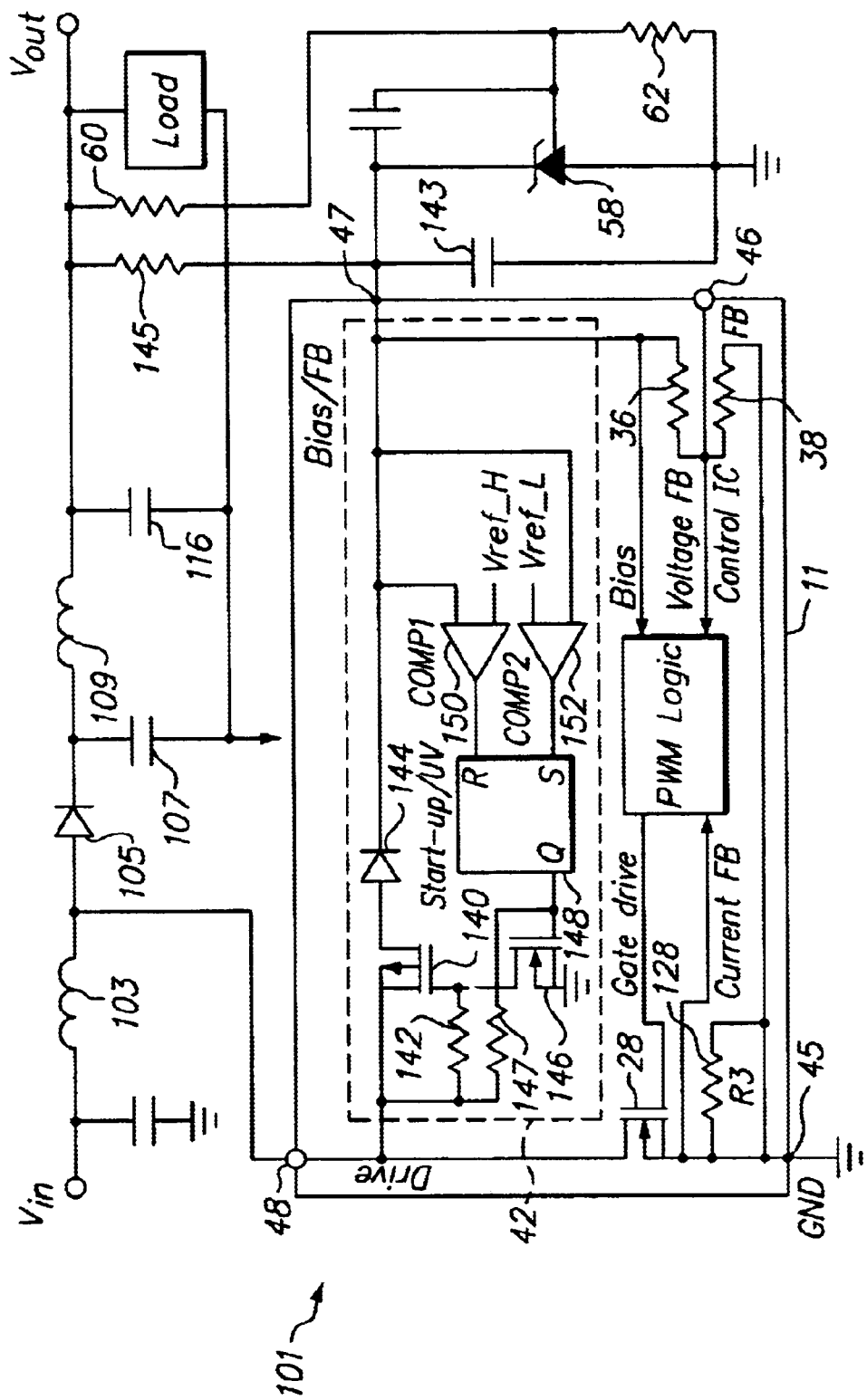
FIG. 2 is a logic block and schematic circuit diagram of a switching power supply following the boost configuration and including start-up circuitry for the low-voltage, CMOS PWM controller IC configured in a three-terminal package in accordance with principles of the present invention.
Figure 3:
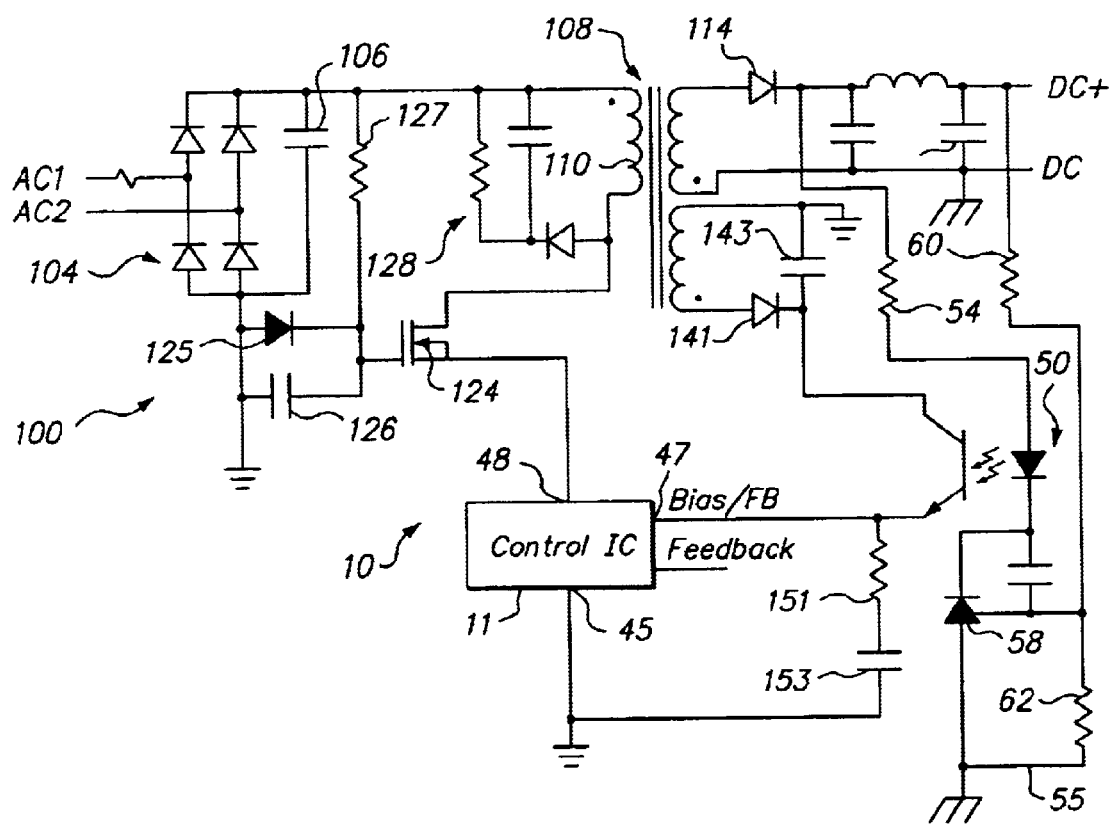
FIG. 3 is a logic block and schematic circuit diagram of an off-line switching power supply employing the CMOS PWM controller IC in a three-terminal package as shown in FIG. 2.

As shown in FIG. 1, the low voltage PWM controller IC has four connection terminals 45, 46, 47 and 48, but can be used in a three terminal arrangement, as shown in FIG. 3, for example. The bias pin 47 enables bias power to be applied to the IC 10 during power-up and during normal operation. During power-up, a startup bias and over/under-voltage logic circuit 42 connects the source of an external high voltage switching FET 124 to the bias pin, thus charging an external capacitor 143 connected to it (see FIGS. 2 and 3). When bias voltage at the bias pin 47 reaches a minimum threshold voltage needed to operate IC 10, PWM pulses are generated and the external high voltage MOSFET 124 begins to switch, delivering power via winding 110 and core of transformer to a secondary winding 112 and a tertiary winding 113 providing bias voltage to the bias pin via a rectifier 141 and smoothing capacitor 143. Once the minimum threshold voltage is reached, the startup circuit 42 is disabled. All reference and operating voltages needed by low voltage PWM IC 10 are derived from the bias power supplied at bias pin 47.

As illustrated in FIG. 1, an off-line switching power supply 100 receives energy from the commercial AC power grid via a suitable connection or connector arrangement. A fuse 102 protects the power supply 100 from fault conditions. A diode bridge 104 full-wave rectifies the incoming AC power into pulsating DC, and a filter capacitor 106 lowers the AC ripple. The resultant DC voltage is applied between ground and an energy-storing primary winding 110 of e.g. a step-down transformer 108. While a step-down flyback converter is shown in the example of FIG. 1, the power supply could provide a step-up transformer, a SEPIC (Single Ended Primary Inductance Converter), a boost converter, or inverting converter, or buck converter. These are all well known in a prior art in PWM power supplies.

As noted above, the transformer 108 also includes a secondary winding 112 feeding a diode rectifier 114, a storage capacitor 116, an output filter inductor 118, and an output filter capacitor 120. These components comprise a "secondary side" of the power supply 100. Since the primary side of power supply 100 is directly connected to the AC voltage lines or mains in the typical off-line switching power supply, the secondary side must be isolated from the primary side to a suitable voltage isolation level or tolerance, typically 3000 volts peak. Secondary side ground is not connected to primary side ground, and different ground symbols are used in the FIG. 1 diagram to indicate this separation of primary and secondary side ground connections.

A high voltage MOS switching transistor 124, which in this example is external to the PWM controller chip 10 to enable high current delivery by the switching power supply 100, alternately passes and blocks current flow through the primary winding 110 of the switching transformer at a predetermined relatively high frequency, such as about 130 kHz.

The high voltage transistor is only needed in high voltage switching applications; in lower voltage applications, the external high voltage transistor 124 maybe omitted. A snubber circuit 128 protects switching transistor 124 against reverse breakdown overvoltage spikes otherwise present in primary winding 110. The duty cycle of the transistor 124 is modulated in order to regulate precisely the operation of the power supply 100 in delivering electrical energy at a regulated output voltage and current to a load attached to, and supplied by, the secondary side.

In accordance with an aspect of the present invention, the low-voltage PWM controller IC 10 provides source control of the high voltage switching transistor 124. In this configuration of PWM controller 10, the high voltage switching transistor 124 is connected and operated in a common-gate, source-switched topology within the power supply 100. In this topology, the source voltage of transistor 124 is switched between a voltage just less than the gate voltage and ground by operation of the PWM controller 10, enabling the use of the low voltage PWM controller IC 10. Gate bias voltage for the high voltage switching transistor 124 is established at a nominal low voltage above primary side ground, such as 125 volts positive, by e.g. a zener diode 125. Voltage to bias the zener diode 125 into reverse (regulating) conduction is obtained from the rectified high voltage DC via e.g. a resistor 127.

A capacitor 126 further smoothes the DC gate voltage established by reverse breakdown characteristics of zener diode 125. Thus, in the source-control arrangement of FIG. 1, the PWM controller IC 10 need switch only between zero and plus 15 volts, for example.

As shown in FIG. 1, the primary side CMOS digital PWM controller IC 10 includes in series with the external high voltage switching transistor 124 a current-carrying low voltage switching FET 20 controlled by width-modulated pulses and a low value current-overload-sensing resistor 22 to primary side ground. Width-modulated pulses are applied by a gate driver 24 to a gate of the FET 20 thereby controlling switching current passing through the high voltage external switching transistor 124.

The control applied to the gate of transistor 20 may be digitally developed in accordance with the teachings of the related patent application entitled "CMOS Digital Pulse Width Modulation Controller" U.S patent application Ser. No. 10/099,703, or it may be generated using other methods known in the art. An alternative approach for generating source control switching is shown in FIG. 1.

As shown in FIG. 1, the primary side controller IC 10 receives control information from two sources. One source is output feedback from the secondary side of power supply 100 via a suitable isolation device. The isolation device is necessary to provide isolation across a voltage (e.g. three kilovolt) isolation barrier separating the primary side from the secondary side of power supply 100. In the configuration shown in FIG. 1, an opto-isolator 50 serves as the isolation device and provides isolation between the secondary (load) side and the primary (off-line) side. The circuit of FIG. 1 has an advantage of directly measuring output voltage provided to the load to create a feedback control signal that is passed across the opto-isolator 50. A light-emitter 52 of opto-isolator 50 is connected to a common node of a series network including a resistor 54 connected to a common node of rectifier 114, capacitor 116 and smoothing choke 118, and an amplifier/voltage reference device 58 connected to secondary side ground. The error amplifier/voltage reference device 58 provides a precision reference voltage and an integration of the error between the reference voltage and the scaled output voltage obtained from a series resistance network of resistors 60 and 62 connected between the secondary output and secondary-side ground. The light level passed by element 52 to a photo-detector element 64 provides a measure of the voltage present at the DC output of power supply 100 feeding an external load. Variations in output voltage relative to reference operating voltage result in changes in light level, and changes in the error signal fed back to the PWM controller IC at a feedback input node 42.

The secondary side output power supply line may also include a current sense resistor enabling sensing magnitude of output current being supplied to a load. An error voltage derived from sensed load current would be combined with an error voltage derived from sensed voltage, and a composite error voltage would be fed back in a known manner to control operation of the primary side PWM controller 10.

In addition to the gate FET 20, source current sense resistor 22 and driver 24, the primary side PWM controller IC 10 includes a precise voltage reference generator circuit 26 for generating at least one reference voltage, an error amplifier 28 for amplifying and conditioning the error signal received at pin 46, and a feedback comparator 30 which compares the feedback voltage to a sawtooth waveform generated by sensing the primary side current of the transformer 108 as developed across resistor 22. When the conditioned and amplified feedback voltage is above the peak of the sawtooth, PWM control logic turns off the external high voltage switching FET 124. The external transistor 124 will remain off until the next clock cycle as generated by a clock generator 40. A blanking generator 32 blanks the input of the feedback comparator 30 and an overcurrent comparator 34 during a blanking interval. The blanking interval covers an initial high current spike at the leading edge of each switch interval which is typically present due to coupling of parasitic capacitance in the primary side of a switching power supply following the topology shown in FIG. 1.

The low voltage PWM controller IC 10 also includes a current-sense comparator 34 which puts out an over-current logic level when current sensed by the sense resistor 22 (except during the blanking interval) exceeds a predetermined current limit, at which point the external transistor 124 is turned off irrespective of secondary side feedback level. In order to provide overcurrent override of the feedback voltage, logical results of comparators 30 and 34 are combined in an AND gate 36 and a composite error level is used to reset a flipflop 38 which determines each PWM interval having an on-off total period fixed by the clock period of clock 40. A logical output of flip-flop 38 is applied by the gate driver 24 to control the gate of FET 20.

Providing source control of the external high voltage FET 124 instead of the conventional gate control techniques has several advantages. First, the overcurrent sensing function, usually performed at the source electrode of the switching transistor, can be combined with a drive pin, hence reducing pin count to three while providing two feedback controls and facilitating low-pin-count, low cost packaging of the IC 10. Second, the PWM controller IC 10 only requires a bias voltage large enough to drive the external switching transistor 124 in a common gate, source-switched configuration. Since the turn-on threshold voltage of the internal FET gate 20 can be made much lower than the threshold needed to switch the external FET 124, the bias voltage requirement is much lower with source control than with the conventional gate control approaches, and this result enables use of a lower cost fabrication process for a low voltage CMOS IC, substantially reducing component cost.

External pins of IC package 12 most preferably include a primary-side ground pin 45, a secondary side feedback pin 46, the bias pin 47 and an output drive pin 48 connecting directly to the source electrode of the external switching transistor 124 in the FIG. 1 example. These pins are electrically wired or connected to appropriate bonding pads of the IC 10 during the IC packaging process at the factory.

In the circuit of FIG. 1 the primary side controller IC ground pin 45 is grounded to a primary side ground (which is typically isolated from a secondary side ground 55 to provide desired voltage isolation between the off-line primary side and the voltage output at the secondary side). In the 3-terminal IC package examples provided by FIGS. 2 and 3, the chip supply voltage and the feedback error voltage are presented together at bias pin 47 and are internally separated via an internal resistance network comprising series resistors 36 and 38 between bias pin 47 and primary side ground 45.

In the configuration shown in FIG. 1, the primary side PWM controller 10 comprises an integrated circuit array encapsulated in a multi-pin plastic package 12, such as a 4, 6 or 8-pin DIP or SOIC configured for conventional through-hole or surface mounting and electrical connection. While a 4 or 8-pin package is preferred for low cost, other package arrangements, such as 3-pin, or 6-pin packages, may be used for embodiments of the primary side low voltage PWM controller 10.

The current in transistor 124 is limited by the chip 10 and is fully protected from over current events. Three-terminal package implementations of the present invention are desirably adapted for and used in low power switching power supply applications where an on-chip output switching FET 20 of IC 10, connected in series with the source electrode of FET 124, is capable of dissipating heat generated during switching events to the external ambient environment.

In accordance with aspects of the present invention by selectively connecting output pads of the IC chip 10 to connection pins, the primary side controller IC may be configured and used either as a three-pin device 11 (FIG. 2) or as a four or more pin device 12 (FIG. 1). This pin/package configuration is carried out at the factory when the IC 10 is encapsulated within the selected package and when its leads are electrically connected to bonding terminal pads of the IC chip and the particular chip is suitably programmed for its particular application/desired characteristics.

As shown within the dashed rectangular box of FIG. 2, the initial start-up circuit 42 comprises a P-channel FET 140 having a gate pull-up resistor 142, a diode 144 for isolating the drive pin 48 from the bias pin 47, and an N-channel FET 146 having a gate pull-up resistor 147, an overvoltage comparator 150, an undervoltage comparator 152, and a latch 148 having an output controlling the gate of the transistor 146.

FIG. 2 illustrates the start-up circuit 42 when the low voltage PWM controller is employed in a boost configuration switching converter 101, without losing generality. When DC is first supplied to a Vin input of converter 101, power flows through inductor 103, diode 105 and becomes stored across capacitor 107. At this initial point the P-channel FET 140 and N-channel FET 146 are biased to a conductive state, since voltage now appears at the drive pin 48. With both FETs 140 and 146 conducting, voltage from the drive pin 48 passes through one-way diode 144 and bias pin 47 whereupon it becomes stored in external capacitor 143. During this process, internal reference voltages setting maximum voltage reference at comparator 150 and minimum voltage reference at comparator 152 are established. When the voltage at bias pin 47 reaches the high reference voltage, comparator 150 resets latch 148 and the NMOS FET 146 is turned off. When FET 146 ceases to conduct, the gate voltage at FET 140 rises to the voltage level at the drive pin 48 because of resistor 142, and PMOS FET 140 turns off, thereby disconnecting the initial start-up voltage path from the drive pin 48 to the bias pin 47. At this point the PWM controller IC 10 begins to function, and continues to be powered by the energy stored in capacitor 143 until the output voltage of converter 101 rises to a level required to power IC 10.

During normal operation of boost converter 101, the controller IC 10 drops the node between inductor 103 and diode 105 toward ground potential, thereby causing energy to become stored in the inductor 103. When the node returns to a high level, that stored energy is passed through diode 105 and becomes stored in capacitor 107, in conventional fashion. This arrangement enables an output voltage to be boosted to a level above the level present at the input Vin.

If the output bias voltage present at pin 47 of IC 10 falls below a lower voltage reference level for any reason, the low voltage comparator 152 sets the latch 148, and the NMOS FET 146 is turned back on to reactivate the initial start-up path and process by turning on PMOS FET 140.

FIG. 3 shows the low voltage PWM controller IC in a three-pin configuration connected in the FIG. 1 switching power supply 100. In this configuration the feedback terminal 46 is not used. The output voltage/current feedback control signal is obtained through a resistance divider network including internal resistors 36 and 38 which connect internally between the bias pin 47 and ground pin 45 of chip 10. The common node of resistors 36 and 38 is internally connected to the feedback pin 46 and provides the feedback signal. The internal bias current consumption of IC 10 is made to be as constant as possible, so that the voltage at the input of amplifier 28 responds only to voltage changes sensed at the output. The three-terminal configuration package 11 along with a low voltage controller IC enable the use of low cost transistor-like packages, such as the standard TO-92 package, etc.

Having thus described preferred embodiments of the invention, it will now be appreciated that the objects of the invention have been fully achieved, and it will be understood by those skilled in the art that many changes in construction and widely differing embodiments and applications of the invention will suggest themselves without departing from the spirit and scope of the invention. Therefore, the disclosures and descriptions herein are purely illustrative and are not intended to be in any sense limiting.

What is claimed is:

1. A three-terminal low-voltage pulse width modulation (PWM) controller embodied in a unitary integrated circuit (IC) comprising:

(a) a first terminal providing an input node for receiving operating bias current supply and a feedback control signal related to an output parameter of an electrical circuit controlled by the PWM controller, (b) a second terminal providing an output node connected to a digital output switch providing digital width-modulated control pulses at a control pulse rate to control duty cycle of the electrical circuit, the digital width-modulated control pulses being width-modulated, (c) a third terminal providing a ground connection, (d) clocked pulse width modulation circuitry responsive to current flow between the second terminal and the third terminal and the feedback control value for controlling width-modulated pulses put out by the digital output switch at the control pulse rate, and (e) feedback separation circuitry for separating the feedback control signal from the operating bias current supply.

2. The three-terminal low-voltage PWM controller set forth in claim 1 including a current sensing resistor in series with the digital output switch and the ground terminal for sensing current flow between the second terminal and the third terminal as a voltage.

3. The three-terminal low-voltage PWM controller set forth in claim 1 further comprising a start-up circuit for initially connecting the second terminal to the first terminal, until the operating bias current supply is present at the first terminal.

4. The three-terminal low-voltage PWM controller set forth in claim 3 wherein the start-up circuit includes a first transistor and a diode in an electrical conduction path from the second terminal to the first terminal, and has a control circuit responsive to presence of the operating bias current supply for turning off the first transistor.

5. The three-terminal low-voltage PWM controller set forth in claim 4 wherein the control circuit includes a second transistor for controlling a gate electrode of the first transistor, the second transistor being controlled by a logic circuit responsive to presence of the operating bias current supply at the first terminal.

6. The three-terminal low-voltage PWM controller set forth in claim 5 wherein the logic circuit includes a high voltage comparator for comparing voltage level at the first terminal with a reference high voltage level, and a latch reset by the high voltage comparator, the latch directly controlling a gate electrode of the second transistor.

7. The three-terminal low-voltage PWM controller set forth in claim 6 wherein the logic circuit additionally includes a low voltage comparator for comparing voltage level at the first terminal with a reference low voltage level, the latch being set by the low voltage comparator in order to turn on the first transistor and reestablish the conduction path from the second terminal to the first terminal.

8. The three-terminal low-voltage PWM controller set forth in claim 1 encapsulated in a three lead TO-92 miniature plastic package for through-hole installation into a circuit board of the electrical circuit, a first lead corresponding to the first terminal, a second lead corresponding to the second terminal, and a third lead corresponding to the third terminal.

9. The three-terminal low-voltage PWM controller set forth in claim 1 wherein the electrical circuit comprises a switching power supply having a switching FET configured in a common-gate mode, and wherein the second terminal connects to a source electrode of the switching FET.

10. The three-terminal low-voltage PWM controller set forth in claim 1 wherein the electrical circuit comprises a DC-to-DC switching boost converter and the second terminal is connected to shunt an energy-storing inductor to ground.

\* \* \* \* \*